United States Patent
Ratasuk et al.

(10) Patent No.: US 10,715,951 B1
(45) Date of Patent: Jul. 14, 2020

(54) POSITIONING SUPPORT FOR WIRELESS DEVICES SUCH AS NR-IOT DEVICES AND USEFUL FOR GEOFENCING

(71) Applicant: Nokia Technologies Oy, Espoo (FI)

(72) Inventors: Rapeepat Ratasuk, Hoffman Estates, IL (US); Ryan Keating, Chicago, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/437,168

(22) Filed: Jun. 11, 2019

(51) Int. Cl.
*H04W 4/021* (2018.01)
*H04W 24/10* (2009.01)

(52) U.S. Cl.
CPC .......... *H04W 4/021* (2013.01); *H04W 24/10* (2013.01)

(58) Field of Classification Search
CPC ..... H04W 24/10; H04W 24/02; H04W 24/04; H04W 24/00; H04W 4/08; H04W 4/021
See application file for complete search history.

(56) References Cited

U.S. PATENT DOCUMENTS

| | | | |
|---|---|---|---|
| 8,320,931 B2 | 11/2012 | Ward et al. | |
| 8,653,956 B2 | 2/2014 | Berkobin et al. | |
| 2014/0094188 A1* | 4/2014 | Kazmi | G01S 5/0242 455/456.1 |
| 2015/0141047 A1* | 5/2015 | Siomina | H04W 24/10 455/456.1 |
| 2017/0201961 A1* | 7/2017 | Siomina | H04W 24/10 |
| 2019/0260487 A1* | 8/2019 | Kazmi | H04B 17/382 |

OTHER PUBLICATIONS

5G Americas "Mobile Video Ecosystem & Geo Fencing for Licensed Content Delivery" Nov. 2017.
Mike Thorpe, M. Kottkamp, A. Rossler, J. Schutz "LTE Location Based Services Technology Introduction" Apr. 2013.
3GPP ETSI TS 129 572 V15.1.0 5G; 5G System; Location Management Services; Stage 3 (3GPP TS 29.572 version 15.1.0 Release 15) Oct. 2018.

* cited by examiner

*Primary Examiner* — Diane D Mizrahi
(74) *Attorney, Agent, or Firm* — Harrington & Smith

(57) ABSTRACT

A UE in a wireless network receives measurement configuration for group(s) of cells wherein the measurement configuration is for positioning measurements of the UE using signals from base station(s). The UE receives criteria based on the measurement configuration for the UE to trigger report(s) for the group(s) of cells. The UE performs, using at least the measurement configuration, positioning measurements of the group(s) of cells and sends a report that is triggered based at least on the criteria. A network element sends the measurement configuration for the group(s) of cells to the UE. The network element sends the criteria based on the measurement configuration for the UE to trigger the report(s) for the one or more groups of cells. The network element receives a report from the UE that was triggered based at least on the criteria. Methods, software, computer program products, and apparatus are disclosed.

17 Claims, 8 Drawing Sheets

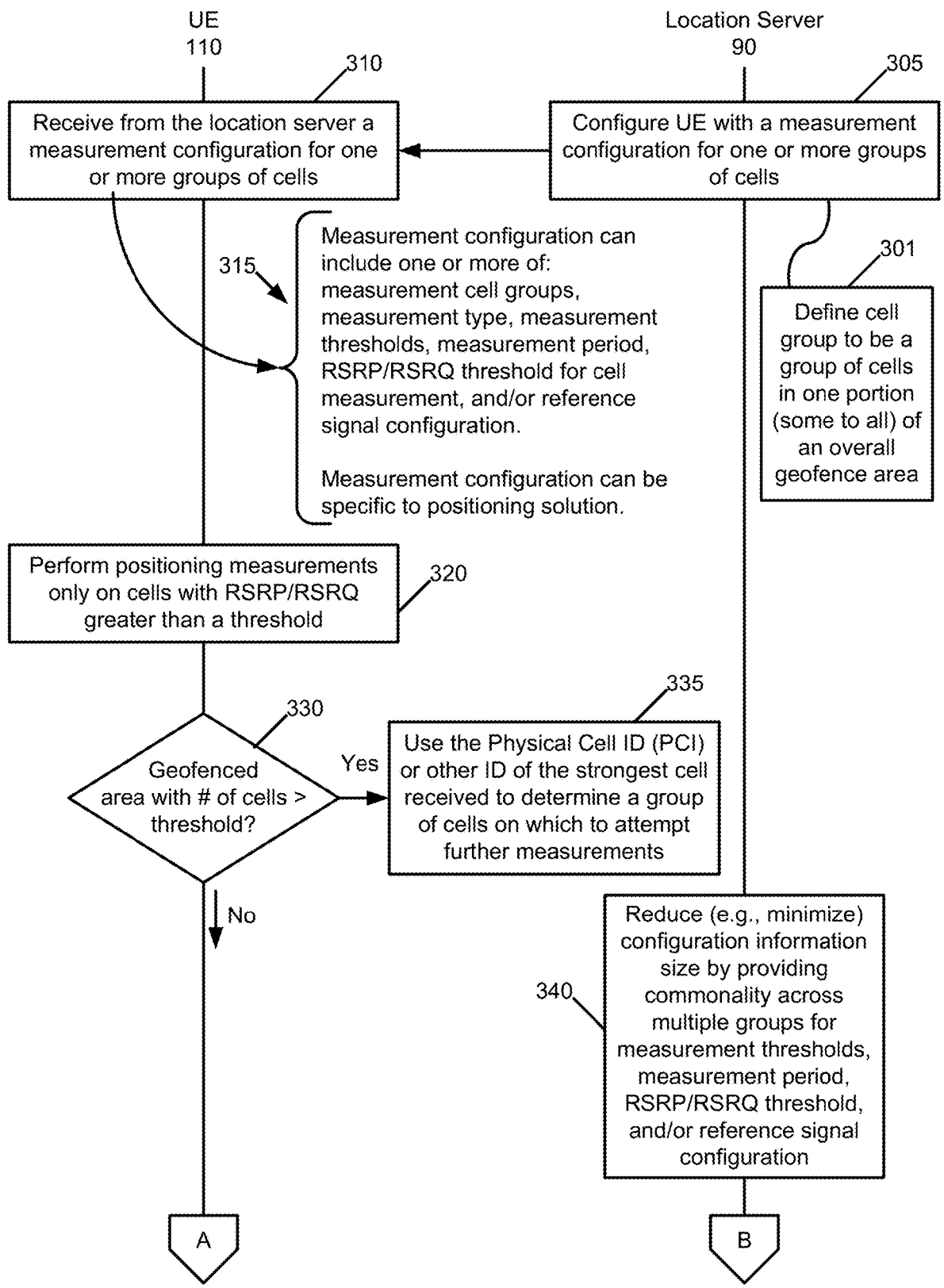
FIG. 3: FIG. 3A

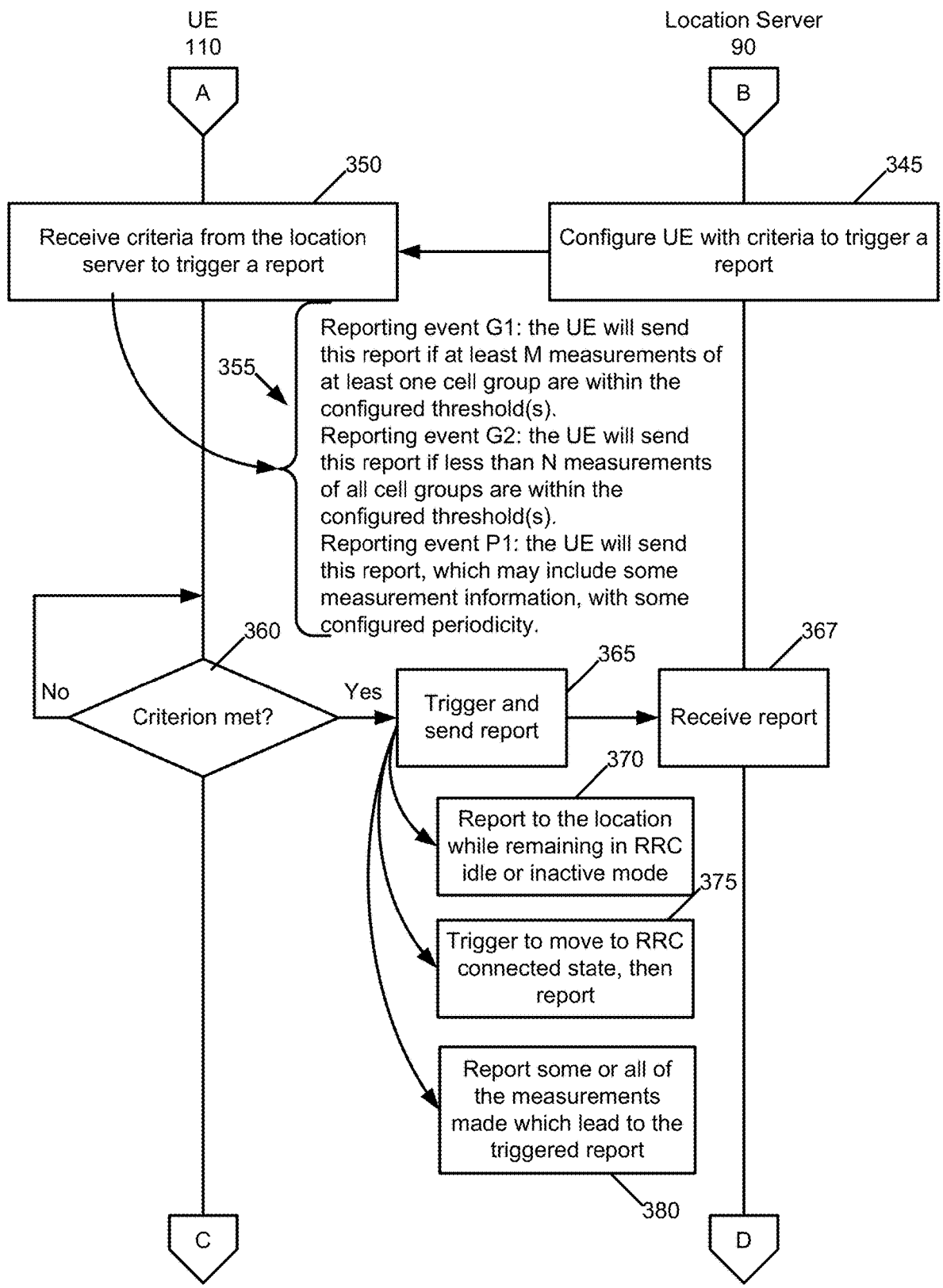
FIG. 3: FIG. 3B

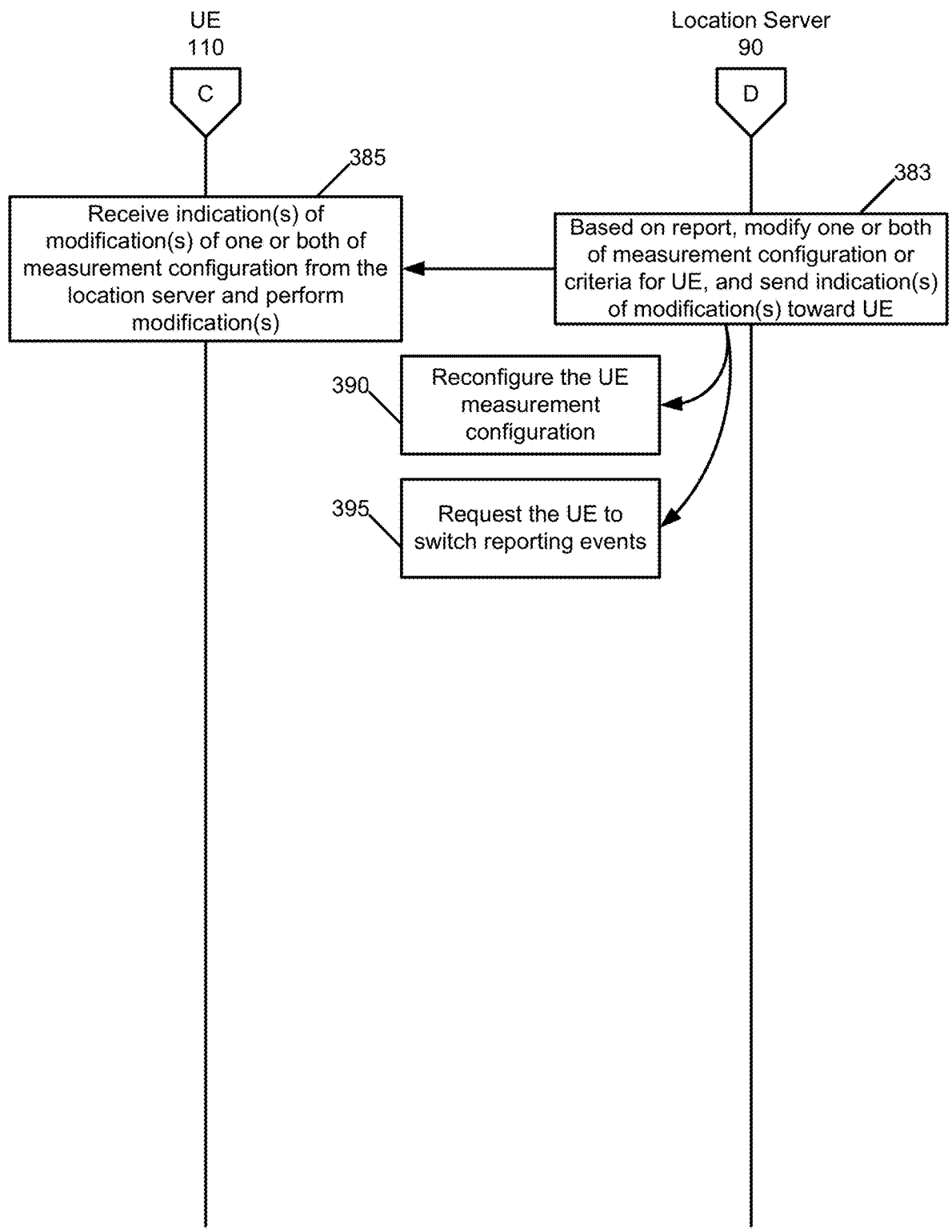
FIG. 3: FIG. 3C

POSITIONING SUPPORT FOR WIRELESS DEVICES SUCH AS NR-IOT DEVICES AND USEFUL FOR GEOFENCING

TECHNICAL FIELD

This invention relates generally to location usage in wireless networks and, more specifically, relates to positioning support for wireless devices.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

One concept that has recently become prevalent is an idea of Internet of things (IoT). This typically is used to encompass everything connected to the Internet, but this term is increasingly being used to define objects that "talk" to each other via the Internet. Such objects include wireless devices having many applications, such as home ovens, refrigerators, electric meters, automobiles, thermostats, and the like. These are also related to machine-type communication (MTC), which enables direct communications among wireless devices. Such communications could take place over a wireless network such as a cellular network or through the cellular network and through the Internet.

In Release 17 (Rel-17), New Radio (NR)-based IoT (NR-IoT) or NR-Lite might be introduced to address use cases between Massive MTC (mMTC) and Ultra-Reliable Low-Latency Communication (URLLC). One key goal of NR-IoT or NR-Lite is to support industrial IoT deployment using low-cost, low-complexity devices with long battery life. Example requirements for NR-IoT include one or more of the following:

1) Data rates up to [10-100] Mbps to support, e.g., live video feed, visual production control, and/or process automation.

2) Latency of around [10-30] ms to support, e.g., remote drone operation, cooperative farm machinery, time-critical sensing and feedback, and/or remote vehicle operation.

3) Positioning accuracy of [30 cm-1 m] to support, e.g., indoor asset tracking, coordinated vehicle control, and/or remote monitoring.

In addition, eMTC and Narrowband Internet of Things (NB-IoT) may also continue to see further improvements in Rel-17.

One important use case for IoT and positioning of devices using IoT is geofencing. A geofence is a virtual perimeter for a geographical area (e.g., airport, city block, factory, port, school, and the like). Geofencing is a feature where an alert is triggered when a device enters or leaves a virtual geofence. Some examples of geofencing use cases include the following:

1) Asset or people tracking—a factory can use geofencing to trigger an alert when an asset leaves the factory, or a parent can use geofencing to trigger an alert when a child leaves an area.

2) Marketing—advertising, location-relevant information, collecting insights about user behaviors, and the like.

3) Smart home—home devices like heating and lighting can turn themselves off after you leave the home.

4) Drones—drones can be confined to be operated only in specific areas e.g. manufacturing plants, ports, or out of specific areas, e.g., airports, prisons, and the like.

For wireless devices and wireless networks, geofencing and other positioning could be improved.

BRIEF SUMMARY

This section is intended to include examples and is not intended to be limiting.

In an exemplary embodiment, a method is disclosed that includes receiving, at a user equipment from a wireless network, measurement configuration for one or more groups of cells wherein the measurement configuration is for positioning measurements of the user equipment using signals from one or more base stations in the wireless network. The method includes receiving, at the user equipment from the wireless network, criteria based on the measurement configuration for the user equipment to trigger one or more reports for the one or more groups of cells. The method includes performing, by the user equipment using at least the measurement configuration, positioning measurements of the one or more groups of cells. The method also includes sending, by the user equipment and toward the network, a report that is triggered based at least on the criteria.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: receiving, at a user equipment from a wireless network, measurement configuration for one or more groups of cells wherein the measurement configuration is for positioning measurements of the user equipment using signals from one or more base stations in the wireless network; receiving, at the user equipment from the wireless network, criteria based on the measurement configuration for the user equipment to trigger one or more reports for the one or more groups of cells; performing, by the user equipment using at least the measurement configuration, positioning measurements of the one or more groups of cells; and sending, by the user equipment and toward the network, a report that is triggered based at least on the criteria.

An exemplary computer program product includes a computer-readable storage medium bearing computer program code embodied therein for use with a computer. The computer program code includes: code for receiving, at a user equipment from a wireless network, measurement configuration for one or more groups of cells wherein the measurement configuration is for positioning measurements of the user equipment using signals from one or more base stations in the wireless network; code for receiving, at the user equipment from the wireless network, criteria based on the measurement configuration for the user equipment to trigger one or more reports for the one or more groups of cells; code for performing, by the user equipment using at least the measurement configuration, positioning measurements of the one or more groups of cells; and code for sending, by the user equipment and toward the network, a report that is triggered based at least on the criteria.

In another exemplary embodiment, an apparatus comprises: means for receiving, at a user equipment from a wireless network, measurement configuration for one or more groups of cells wherein the measurement configuration is for positioning measurements of the user equipment using signals from one or more base stations in the wireless network; means for receiving, at the user equipment from the wireless network, criteria based on the measurement configuration for the user equipment to trigger one or more reports for the one or more groups of cells; means for performing, by the user equipment using at least the measurement configuration, positioning measurements of the one or more groups of cells; and means for sending, by the user equipment and toward the network, a report that is triggered based at least on the criteria.

In an exemplary embodiment, a method is disclosed that includes sending, at a network element in a wireless network and toward a user equipment in the wireless network, measurement configuration for one or more groups of cells, wherein the measurement configuration is for positioning measurements of the user equipment using signals from one or more base stations in the wireless network. The method also includes sending, from the network element and toward the user equipment, criteria based on the measurement configuration for the user equipment to trigger one or more reports for the one or more groups of cells. The method further includes receiving, at the network element and from the user equipment, a report that was triggered based at least on the criteria.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: sending, at a network element in a wireless network and toward a user equipment in the wireless network, measurement configuration for one or more groups of cells, wherein the measurement configuration is for positioning measurements of the user equipment using signals from one or more base stations in the wireless network; sending, from the network element and toward the user equipment, criteria based on the measurement configuration for the user equipment to trigger one or more reports for the one or more groups of cells; and receiving, at the network element and from the user equipment, a report that was triggered based at least on the criteria.

An exemplary computer program product includes a computer-readable storage medium bearing computer program code embodied therein for use with a computer. The computer program code includes: code for sending, at a network element in a wireless network and toward a user equipment in the wireless network, measurement configuration for one or more groups of cells, wherein the measurement configuration is for positioning measurements of the user equipment using signals from one or more base stations in the wireless network; code for sending, from the network element and toward the user equipment, criteria based on the measurement configuration for the user equipment to trigger one or more reports for the one or more groups of cells; and code for receiving, at the network element and from the user equipment, a report that was triggered based at least on the criteria.

In another exemplary embodiment, an apparatus comprises: means for sending, at a network element in a wireless network and toward a user equipment in the wireless network, measurement configuration for one or more groups of cells, wherein the measurement configuration is for positioning measurements of the user equipment using signals from one or more base stations in the wireless network; means for sending, from the network element and toward the user equipment, criteria based on the measurement configuration for the user equipment to trigger one or more reports for the one or more groups of cells; and means for receiving, at the network element and from the user equipment, a report that was triggered based at least on the criteria.

BRIEF DESCRIPTION OF THE DRAWINGS

In the attached Drawing Figures:

FIG. 3, spread over FIGS. 3A, 3B, and 3C, is a combination signaling diagram and flowchart for geofencing support for wireless devices such as NR-IoT devices, in accordance with an exemplary embodiment;

DETAILED DESCRIPTION OF THE DRAWINGS

Figure 1:
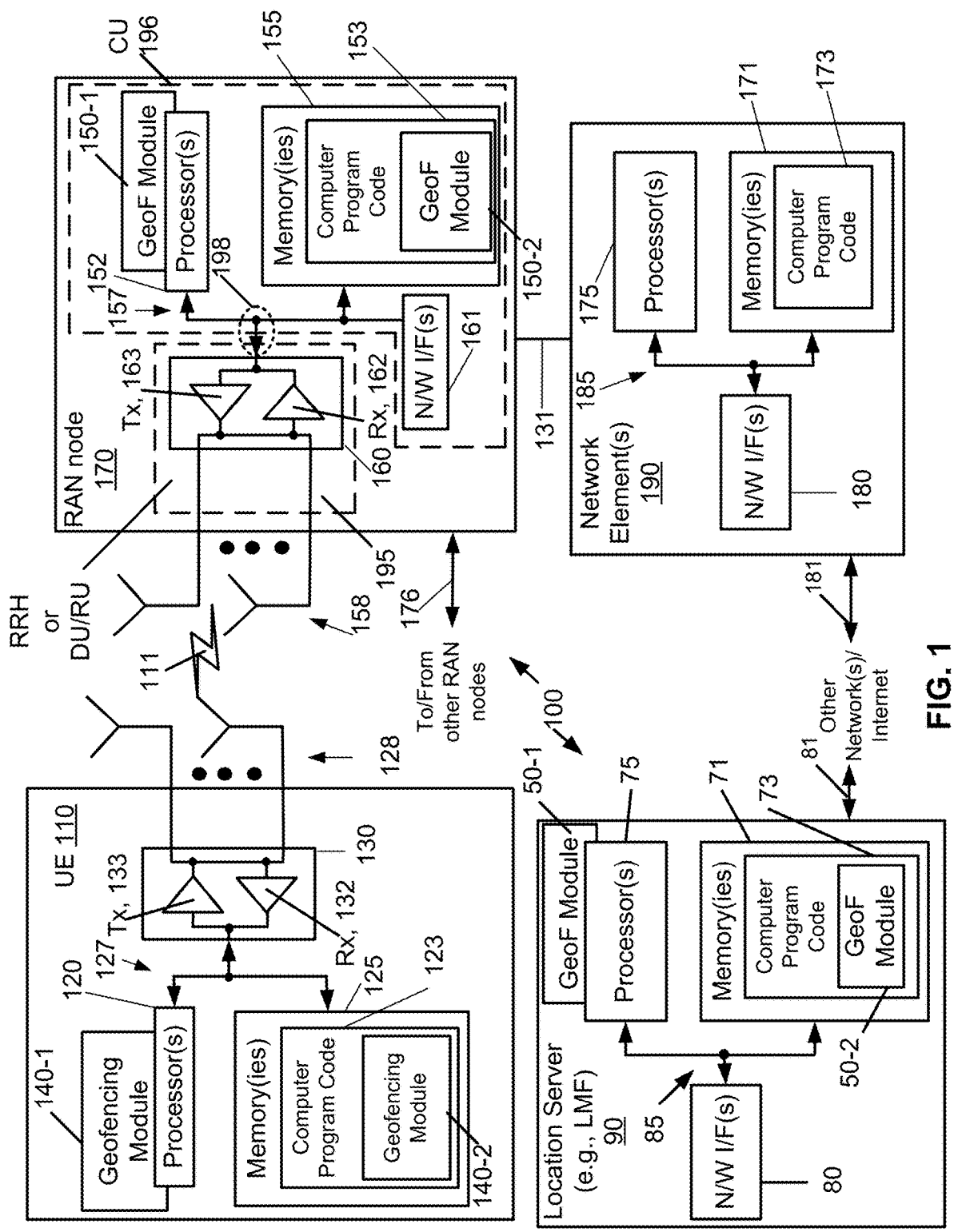
FIG. 1 is a block diagram of one possible and non-limiting exemplary system in which the exemplary embodiments may be practiced.

The following abbreviations that may be found in the specification and/or the drawing figures are defined as follows:

3GPP third generation partnership project
5G fifth generation
5GC 5G core network
AMF access and mobility management function
AoA angle of arrival
AoD angle of departure
Cat-M Category M, the second generation of LTE chipsets meant for IoT applications
CU central unit
DL downlink
DRX discontinuous reception
DU distributed unit
E-CID Enhanced Cell ID eDRX enhanced (also called extended) discontinuous reception
EDT early data transmission
eMTC enhanced machine type communication
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
GeoF geofencing
gNB (or gNodeB) base station for 5G/NR, i.e., a node providing NR user plane and control plane protocol terminations towards the UE, and connected via the NG interface to the 5GC
GPS global positioning system
ID identifier
I/F interface
IoT Internet of things
LTE long term evolution
LMF location management function
MAC medium access control
MME mobility management entity
MTC machine-type communication
mMTC massive MTC
NB-IoT narrowband Internet of things
ng or NG next generation
ng-eNB or NG-eNB next generation eNB
NR new radio
NR-IoT new radio—Internet of things
N/W or NW network
OTDOA observed time difference of arrival
PCI physical cell ID
PDCP packet data convergence protocol
PHY physical layer
PRS positioning reference signal
PUR preconfigured uplink resource
RAN radio access network
Rel release
RLC radio link control
RRH remote radio head
RRC radio resource control
RSRP reference signal received power
RSRQ reference signal received quality
RSTD reference signal time difference
RTT round trip time
RU radio unit
Rx receiver
SDAP service data adaptation protocol
SGW serving gateway
SINR signal to interference plus noise ratio
SMF session management function
SSB synchronization signal block
TS technical specification
TRxP (or TRP) transmission reception point
Tx transmitter
UE user equipment (e.g., a wireless, typically mobile device)
UPF user plane function
URLLC ultra-reliable low-latency communication The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for positioning support for wireless devices such as NR-IoT devices and useful for geofencing. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, a location server 90, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a geofencing module 140, comprising one of or both parts 140-1 and/or 140-2, which may be implemented in a number of ways. The geofencing module 140 may be implemented in hardware as geofencing module 140-1, such as being implemented as part of the one or more processors 120. The geofencing module 140-1 may be implemented also as an integrated circuit or through other hardware such as a programmable gate array. In another example, the geofencing module 140 may be implemented as geofencing module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a geofencing module 150, comprising one of or both parts 150-1 and/or 150-2, which may be implemented in a number of ways. The geofencing module 150 may be implemented in hardware as geofencing module 150-1, such as being implemented as part of the one or more processors 152. The geofencing module 150-1 may be implemented also as an integrated circuit or through other hardware such as a programmable gate array. In another example, the geofencing module 150 may be implemented as geofencing module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the geofencing module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells. It is further noted that a single cell may have multiple Transmission Reception Points (TRxPs or TRPs) that are used in order to form the cell.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The location server 90 is a server that in general supports location determination for UEs 110. This may also be referred to as a location management function (LMF), which is the 3GPP terminology for a location server in NR. The terms location server and LMF may be used interchangeably. An LMF is a network entity in the 5G Core Network (5GC) supporting the following functionality: 1) Supports location determination for a UE; 2) Obtains downlink location measurements or a location estimate from the UE; 3) Obtains uplink location measurements from the NG RAN; and 4) Obtains non-UE associated assistance data from the NG RAN. See, e.g., "5G; 5G System; Location Management Services; Stage 3", ETSI TS 129 572 V15.1.0 (2018-10) (3GPP TS 29.572 version 15.1.0 Release 15).

The location server 90 includes a geofencing module 50, comprising one of or both parts 50-1 and/or 50-2, which may be implemented in a number of ways. The geofencing module 50 may be implemented in hardware as geofencing module 50-1, such as being implemented as part of the one or more processors 75. The geofencing module 50-1 may be implemented also as an integrated circuit or through other hardware such as a programmable gate array. In another example, the geofencing module 50 may be implemented as geofencing module 50-2, which is implemented as computer program code 73 and is executed by the one or more processors 75. For instance, the one or more memories 71 and the computer program code 73 are configured to, with the one or more processors 75, cause the location server 90 to perform one or more of the operations as described herein. The one or more network interfaces 80 communicate over a network such as via the link 81, e.g., through the other networks and via link 181 to the network element(s) 190. The one or more buses 85 may be address, data, or control buses, and may include any interconnection mechanism, such as a series of lines on a motherboard or integrated circuit, fiber optics or other optical communication equipment, wireless channels, and the like.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, 171, and 71 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, 171, and 71 may be means for performing storage functions. The processors 120, 152, 175, and 75 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, 175, and 75 may be means for performing functions, such as controlling the UE 110, RAN node 170, location server 90, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances (including Internet of Things devices) permitting wireless Internet access and possibly browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

Figure 2:
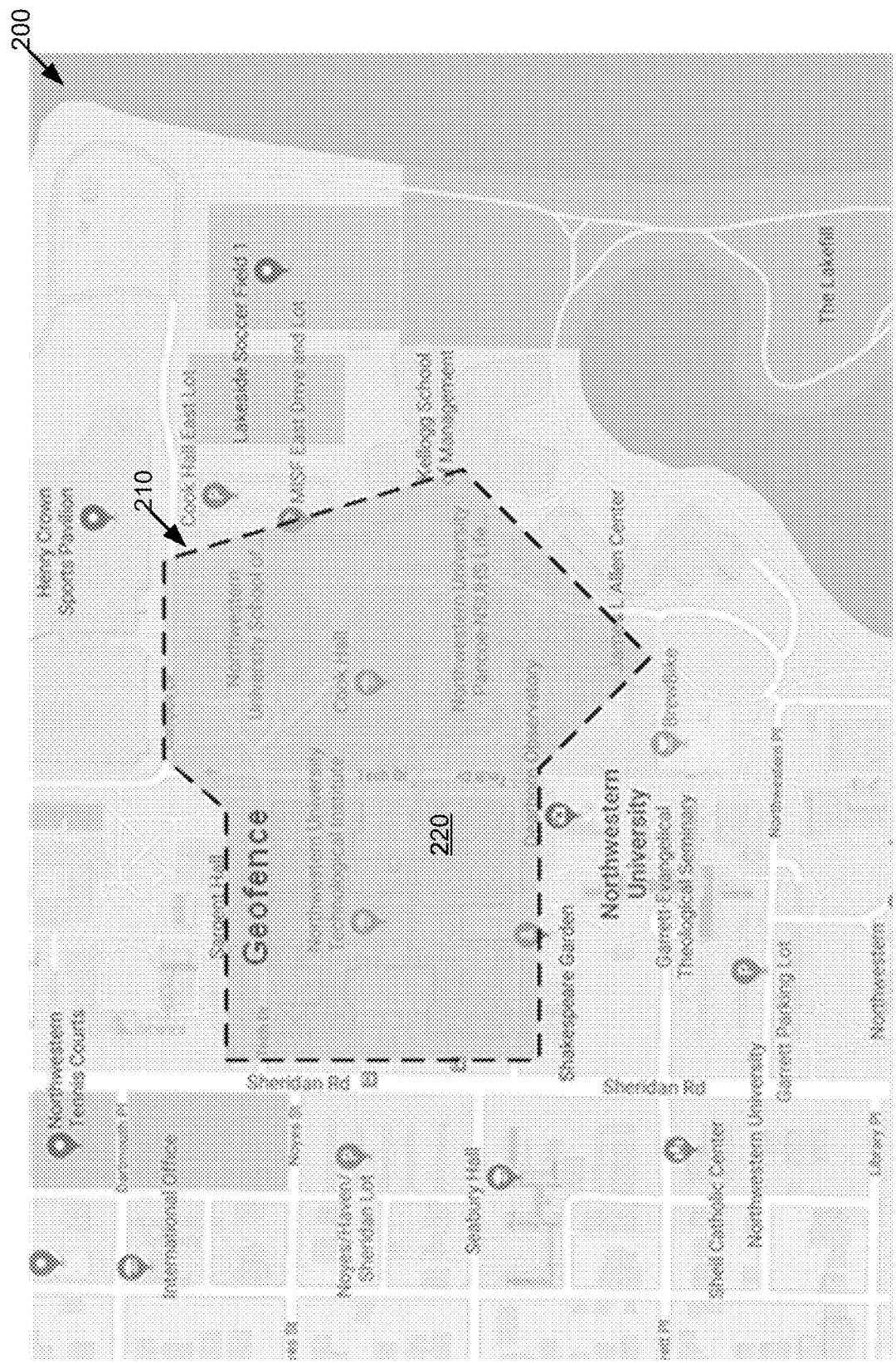
FIG. 2 illustrates an example of a geofence, in accordance with an exemplary embodiment.

As described previously, one important use case for IoT is geofencing. A geofence is a virtual perimeter for a geographical area (e.g. airport, city block, factory, port, school, etc.). Geofencing is a feature where an alert is triggered when a device enters or leaves a virtual geofence. An example of a geofence is shown in FIG. 2. The geofence 210 is illustrated on the map 200 and covers some area 220 around or near the Northwestern University Technological Institute. The geofence 210 can be used e.g. for asset tracking, customer targeting, marketing, and the like. As also previously described above, in Rel-17, NR-IoT may be introduced to address use cases between mMTC and URLLC. In addition, eMTC and NB-IoT may continue to see further improvements in Rel-17. One important use case for IoT is geofencing, e.g., as illustrated in FIG. 2.

Typically, geofencing relies on GPS for positioning information. However, low-cost IoT devices may not have a GPS chipset. For instance, many low-end NB-IoT and Cat-M (Category M, the second generation of LTE chipsets meant for IoT applications) modules do not have GPS capability. IoT devices, even with GPS chipsets, may also be operating indoors with poor GPS signal reception.

As an alternative to GPS, IoT devices might support Observed Time Difference of Arrival (OTDOA) positioning technology. It is noted that OTDOA is now being called Downlink Time Difference of Arrival (DL-TDOA) in NR. Since these appear to be similar or the same positioning solutions and to provide clarity, the term "OTDOA" is used herein. Using OTDOA for geofencing, however, is extremely inefficient or even impractical, as the location server must periodically trigger the UE to perform measurements. This procedure can only currently (e.g., in legacy networks) be performed in RRC connected mode, so idle-mode or inactive-mode UEs must transition into RRC connected mode (e.g., thereby wasting power and causing additional signaling). Furthermore, the measurements are transmitted back to the location server for positioning estimation. This results in large signaling overhead, especially since most of the time the UE is either within or outside the confine of the geofence and no alert will be triggered.

The general idea of geofencing has been around for some time. In U.S. Pat. No. 8,653,956 (entitled, "Method and system for implementing a geofence boundary for a tracked asset"), they track an asset by using a geofence boundary. However, in U.S. Pat. No. 8,653,956, they require the device to have a GPS receiver and to report the GPS position explicitly to the network. For the IoT use case, this would be very costly for the UE to continually track the GPS position and report the position back to the network. As pointed out in Section 3 of U.S. Pat. No. 8,653,956, some UEs may not have GPS functionality at all or have poor GPS signal quality.

Another way to provide geofencing services is to use a cellular based positioning method. In U.S. Pat. No. 8,320,931 (entitled, "Geo-fencing in a Wireless Location System"), they propose that uplink time difference of arrival (UTDOA) is used to periodically check the UE position in the geofence. This requires the UE to transmit a reference signal and is costly as this technique requires a UE to move to RRC connected mode.

Therefore, techniques to support geofencing using wireless networks using, e.g., cellular technology are needed to overcome these and other limitations.

Exemplary embodiments herein propose the use of measurements from groups of cells and provision of reporting criteria to trigger an alert related to geofencing. The method is applicable to many positioning solutions and specific embodiments are provided for some common techniques such as OTDOA, AoA/AoD, SSB-based, and the like. For clarity, the term "positioning solution" is used herein to refer to positioning techniques or methods or suchlike, where an individual positioning solution is typically a method which uses a certain type of measurement to estimate the UE position (e.g., OTDOA which uses RSTD). This includes E-CID (Enhanced Cell ID), although this solution uses a variety of measurements to enable a single base station to perform positioning. In some cases, the certain type of measurement in a positioning solution may be reached by a combination of other measurements (e.g., RTT estimates are formed from multiple measurements). With respect to the exemplary embodiments, exemplary steps are provided below, and more detailed steps and additional embodiments are provided afterward.

As one step, the UE 110 is configured by the location server 90 with a measurement configuration and reporting criteria for groups of cells. The measurement configuration can include one or more of the following: measurement cell groups, measurement type, measurement thresholds, measurement period (e.g. every time period or every DRX/eDRX cycle), RSRP/RSRQ (or other reference signal) threshold for cell measurement, and reference signal configuration. The measurement configuration can be specific to positioning solution.

The UE 110 performs measurements, in an exemplary embodiment, only on cells with RSRP/RSRQ greater than a threshold. Other measurements may also be used.

In the case of a geofenced area (such as area 220 of FIG. 2) where the number of cells is large, the UE may use the Physical Cell ID (PCI) of the strongest cell the UE receives to determine the group of cells on which the UE will attempt further measurements. For a large number of cells, the measurement thresholds, measurement period, RSRP/RSRQ threshold, and/or even reference signal configuration could be common across multiple groups to minimize the configuration information size.

In another step, the UE 110 is configured by the location server 90 with criteria to trigger a report. A number of reporting events are possible.

A reporting event G1 is one such event. In this event, the UE will send this report if at least M measurements of at least one cell group are within the configured thresholds. Note that this could be for when UE enters the geofenced area.

Another reporting event is a reporting event G2. For this event, the UE will send this report if at most N measurements of all cell groups are within the configured thresholds. This could be for when UE leaves the geofenced area.

An advantage and technical effect of the exemplary embodiments are that the measurement configurations represent a significant reduction in measurement requirements, compared with the full configuration for a given positioning solution. This saves the UE a potentially large amount of power. The UE also only needs to report when the UE is triggered to do so rather than reporting for each positioning measurement that the UE makes. This additionally allows the UE to stay in an idle or inactive mode rather than remaining in a connected mode. Another advantage and technical effect are that the actual position of the UE does not need to be calculated explicitly during the geo-fence process.

More detail is now presented. This detail is initially presented in reference to FIG. 3, which is spread over FIGS. 3A, 3B, and 3C. FIG. 3 is a combination signaling diagram and flowchart for geofencing support for wireless devices such as NR-IoT devices, in accordance with an exemplary embodiment. Operations for the UE 110 and location server 90 are shown, as is exemplary signaling performed between these. The operations in this figure are assumed to be performed by either the UE 110, under control of the geofencing module 140, or by the location server 90, under control of the geofencing module 50. FIG. 3 illustrates the operation of an exemplary method or methods, a result of execution of computer program instructions embodied on a computer readable memory, functions performed by logic implemented in hardware, and/or interconnected means for performing functions in accordance with exemplary embodiments.

In FIG. 3, the UE 110 is configured by the location server 90 with a measurement configuration for groups of cells (e.g., the cells created by corresponding RAN nodes 170). This occurs in block 305, where the location server 90 configures the UE with a measurement configuration for one or more groups of cells, and in block 310, where the UE 110 receives from the location server 90 a measurement configuration for the one or more groups of cells.

It is noted that block 305 can include block 301, where the location server 90 defines a cell group to be a group of cells in one portion (some to all) of an overall geofence area. For instance, the northern corner of a harbor could represent a cell group, where the entire harbor is the geofence area. Thus, block 305 could include sending a measurement configuration for a single group of cells, representing a portion (not all in this example) of the harbor, or sending multiple measurement configurations for multiple groups of cells, representing the entire harbor. Also, it might be possible in some instances that a single group of cells (or possibly a single cell or part of a single cell's coverage area) could be defined to cover an entire geofence area.

As illustrated by reference 315, the measurement configuration can include measurement cell groups, measurement type, measurement thresholds, measurement period, RSRP/RSRQ threshold for cell measurement, and/or reference signal configuration. As also illustrated by reference 315, the measurement configuration can be specific to a positioning solution. This means that the specific configuration will likely depend on the positioning solution used. For example, the parameters, number of cells, thresholds, and the like may be different for an OTDOA geofence versus a DL-AoD geofence, but could correspond to roughly the same physical area. Examples of such positioning solutions are described below. Additionally, the measurement configuration in block 305 may include the information in block 315 and also the threshold in block 320.

In block 320, the UE 110 performs in an exemplary embodiment positioning measurements only on cells with RSRP/RSRQ (as examples) greater than a threshold. While RSRP/RSRQ are referred to, any reference signal power and corresponding threshold might be used.

In the case of a geofenced area where the number of cells is large (e.g. greater than a threshold configured by the network, such as 10 or 20 cells) the UE may use the PCI (or other indicator) of the strongest cell the UE receives to determine the group of cells to which the UE will attempt further measurements. For a large number of cells the measurement thresholds, measurement period, RSRP/RSRQ threshold, and/or even reference signal configuration could be common across multiple groups to minimize the configuration information size. This is illustrated in FIG. 3 by block 330, where the UE determines whether a geofenced area has a number (#) of cells greater than (>) a threshold. If so (block 330=Yes), the UE in block 335 uses the Physical Cell ID (PCI) or other ID of the strongest cell received to determine a group of cells on which to attempt further measurements. Block 340 indicates an additional possible example, where the location server 90 reduces (e.g., minimizes) configuration information size by providing commonality across multiple groups for measurement thresholds, measurement period, RSRP/RSRQ threshold, and/or reference signal configuration. Note that this means in block 310, the measurement configuration would be smaller by the reduction in block 340 that it would be without this reduction. In response to UE determining the geofenced area does not have the number of cells greater than the threshold (block 330=No), the flow for the UE proceeds to block 350.

The UE 110 is configured by the location server 90 with criteria to trigger a report. Note that this configuration may occur before one or both of blocks 310, 320. This configuration is illustrated by the location server 90 in block 345 configuring the UE with criteria to trigger a report, and in block 350 by the UE 110 receiving criteria from the location server to trigger a report. Multiple possible reports are described below and illustrated by reference 355. These are new geofencing-specific reporting events.

One possible report is a reporting event G1. For this reporting event, the UE will send this report if at least M measurements of at least one cell group are within the configured threshold(s). This report could be for when the UE 110 enters the geofenced area. Regarding M measurements, this means that each group would be at least size M. The size of M varies and will depend mainly on the following two factors:

a) The required accuracy of the geofence (e.g., more positioning measurements correspond to higher accuracy); and b) The overall size of the geofence, e.g., for a small area like a school or factory, the size of M may be small, such as 4-5, whereas for a larger area, M could be 6-10 or even higher.

Figure 4:
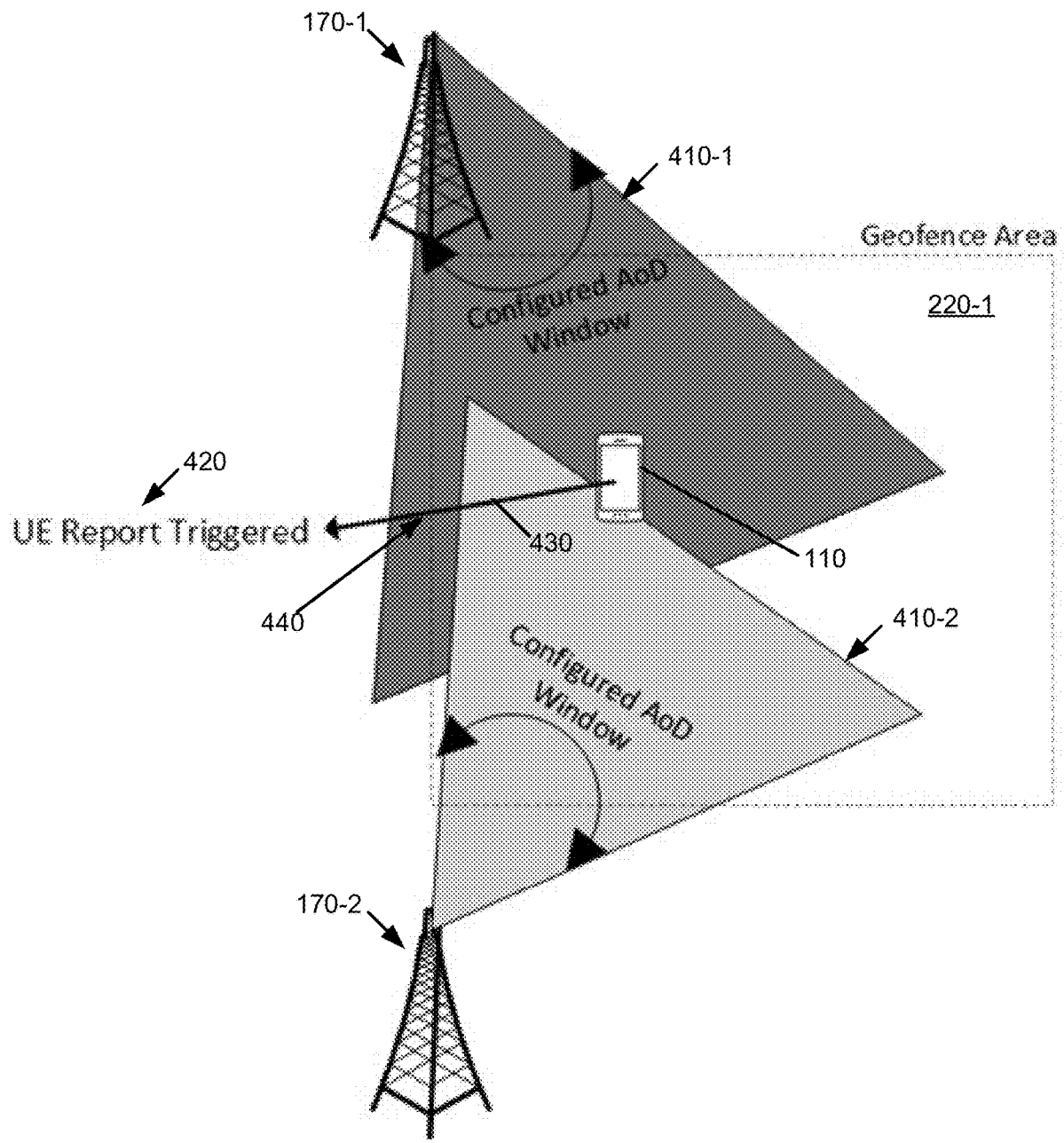
FIG. 4 is an example of a UE reporting in response to leaving an AoD configured geofence, in accordance with an exemplary embodiment.

Another possible report is a reporting event G2. For this reporting event, the UE will send this report if less than N measurements of all cell groups are within the configured threshold(s). This could be for when UE leaves the geofenced area. As with M, the size of N varies, e.g., according to the factors given above. FIG. 4 shows an example of how this could look. Turning briefly to FIG. 4, this figure is an example of a UE reporting in response to leaving an AoD configured geofence, in accordance with an exemplary embodiment. Two RAN nodes 170-1, 170-2 are shown, each with its corresponding configured AoD window 410-1, 410-2, respectively. An exemplary geofence area 220-1 is also shown. The UE 110 is moving as illustrated by the path 430. In response to the UE transitioning out of the geofenced area, indicated by reference 440, a UE report is triggered, as illustrated by reference 420. In this example, there are two measurements (one for each RAN node 170-1, 170-2) that would meet corresponding thresholds, and the UE 110 has a report triggered. In more detail, at point 430, the UE is within the configured AoD window for both 170-1 and 170-2 (the triangles are not mutually exclusive). When the UE moves to point 420 then the UE is in neither configured AoD window 410-1, 410-2. At that point, the number of measurements with the configured thresholds is zero, which is less than N=1 (as an example), and the reporting event G2 is triggered.

In terms of measurement configuration for geofencing, the simplest one to envision is probably for Angle of Departure (AoD) in FIG. 4. If the UE has an AoD inside the range, then the UE falls in the triangular area in the 2-D plane (e.g., the configured AoD window 410-1 for RAN node 170-1). Then, using an overlapping number of these, one can continue to restrict the size of the geofence until the size is what is required for the particular application.

This same concept applies to all the measurement types described herein. The shape from one particular measurement, however, is not always a triangle (in the 2-D plane) as in the AoD case. It should also be noted that both M and N are integers and that they are both greater then 0 (zero). However, M does not have to be larger than N. It is possible that M=N or N>M, as examples. M and N are independent choices for different geofences.

Returning to reference 355 of FIG. 3, another possible report is a reporting event P1. For this reporting event, the UE will send this report, which may include some measurement information, with some configured periodicity. This could be for when the network wishes to loosely track some position information about the UE. The configured periodicity could include at least one of the following information: status of the user equipment relative to a geofence area or some measurement information. The UE 110 then sends reports at the periodicity and including the corresponding information.

In block 360, the UE 110 determines whether a criterion has been met to trigger sending a report. If not (block 360=No), the UE 110 waits for a criterion to be met. If a criterion has been met (block 360=Yes), the UE 110 triggers the report and sends the report to the location server 90 in block 365, and the location server 90 receives this in block 367. The report may just be a small report saying that event G1 (as an example) was triggered, so then the location server knows the UE entered an area. It is also possible the location and/or the measurements to be reported along with an indication of the G1 report. The inclusion could be configurable by the network.

In one embodiment, the UE reports to the location server while remaining in RRC idle or inactive mode, for example using EDT or PUR. See block 370. Alternatively, the reporting event may trigger the UE to move to RRC connected state and then send the report, in block 375. Additionally or alternatively, the UE 110 may be configured to report some or all of the measurements the UE makes which lead to the triggered report. See block 380. For example, if the network quickly wants some more precise positioning information after the network knows the UE has entered or left a geofenced area. This additional measurement reporting may be preconfigured or alternatively, dynamically requested by the network after receiving the initial report from the UE.

Based on the UE's report, the location server 90 in block 383 modifies one or both of measurement configuration or criteria for UE, and send indication(s) of modification(s) toward the UE. The UE in block 385 receives the indication(s) of the one or both of measurement configuration or criteria and performs the modification(s) in block 385. The modifications may include one or more of the previously described information sent to the UE. For example, the modifications may reconfigure the UE measurement configuration (block 390) and/or simply request the UE to switch reporting events (block 395). The switching could be that the UE has entered a geofenced area and the network now wants the UE to report if the UE leaves that geofenced area. This modifications may be for a new geofence area, or could also change the positioning solution used if the location server 90 had some information about which solution may be more accurate, e.g., for the new location into which the UE has transitioned. It may further be that a large geofence area or one with many cells to cover the area being traversed, and the UE is configured (e.g., as in block 305) with additional cell groups for other portions of the geofence area. An additional possibility is the location server 90 would report the crossing of the geofence area to another entity. For instance, a homeowner could set a geofence area as a neighborhood around his or her house, and the homeowner's smartphone would be alerted (e.g., via an app) whenever this geofence was breached.

Specific embodiments related to different positioning techniques are provided below.

Figure 5:
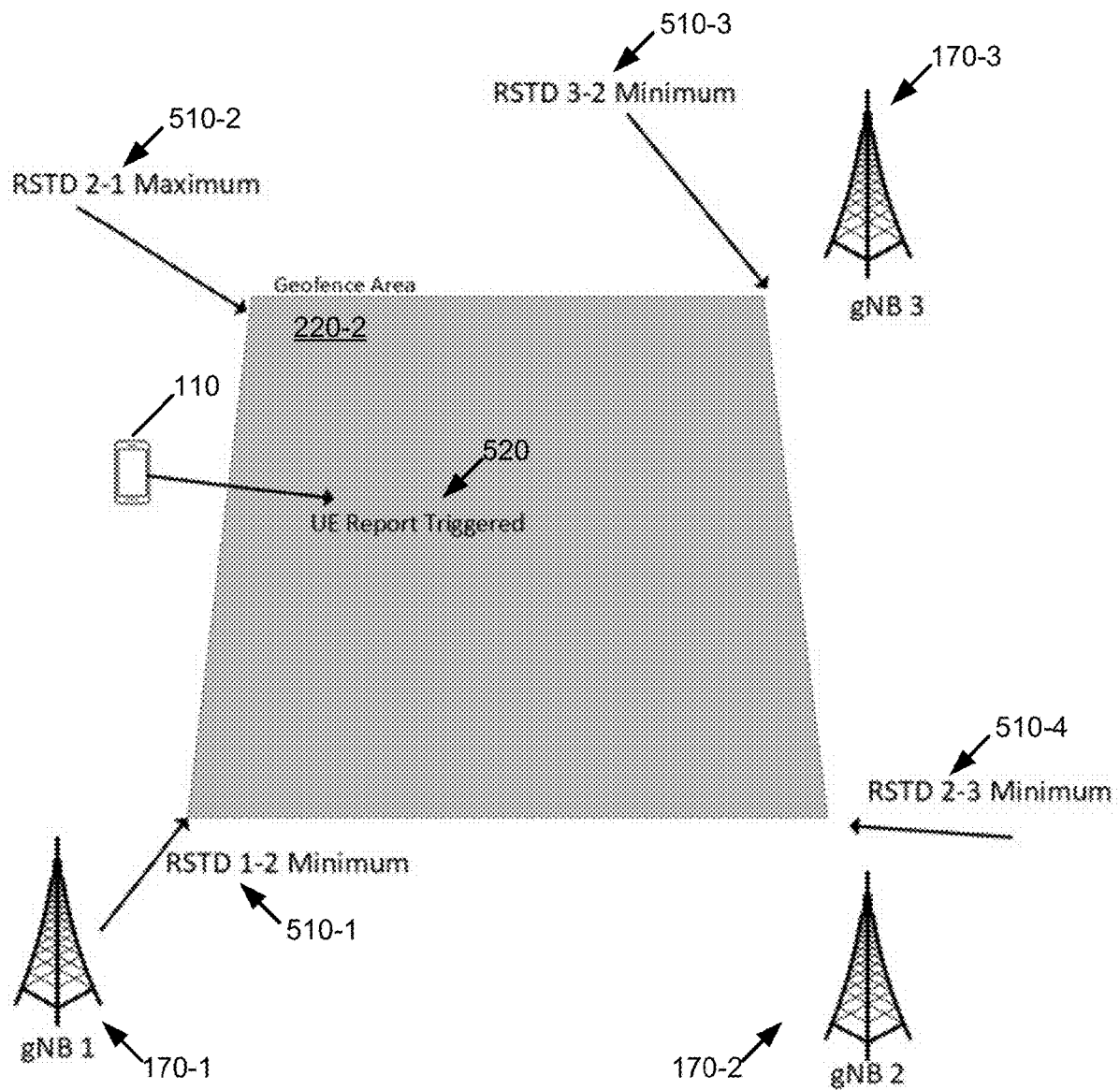
FIG. 5 is an example of G1 event reporting for an OTDOA configured geofence area, in accordance with an exemplary embodiment.

With respect to the positioning solution of OTDOA, FIG. 5 shows how this could look for a geofence. FIG. 5 is an example of G1 event reporting for an OTDOA configured geofence area, in accordance with an exemplary embodiment. In FIG. 5, there are three gNBs 1 170-1, 2 170-2, and 3 170-3 (in this example, the RAN nodes are gNBs), with a geofence area 220-2 shown. In OTDOA, the measurements made by the UE are called reference signal time difference (RSTD). One RSTD measurement corresponds to the difference in time of arrival of two reference signals which normally correspond to two different cells or TRPs. The RSTD 1-2 minimum 510-1 is a minimum RSTD that occurs between eNB 1 and eNB 2. The RSTD 2-3 minimum 510-2 is a minimum RSTD that occurs between eNB 2 and eNB 3. The RSTD 3-2 minimum 510-3 is a minimum RSTD that occurs between eNB 3 and eNB 2. The RSTD 2-1 maximum 510-4 is a maximum RSTD that occurs between eNB 2 and eNB 3. As a reminder, in a reporting event G1, the UE will send this report if at least M measurements of at least one cell group are within the configured thresholds. In the example of FIG. 5, the UE 110 enters the geofence area 220-2 and determines that at least M measurements for this group of cells (the cells formed by the eNBs 170-1, 170-2, and 170-3) are above corresponding thresholds for these cells. The UE 110 therefore has a report triggered, as indicated by reference 520. In this example, M is certainly related to the number of cells in the group but M could be smaller than the number of cells. Depending on the specific geofence, it may be sufficient to know that 3 out of 5 thresholds are met for example. In the specific example of FIG. 5, M may be two (e.g., for gNB 1 and 3) or three (e.g., for gNB 1, 2, and 3), depending on the actual physical proximity of these cells 170 for this particular illustrated group of three cells.

The following is an example measurement configuration for OTDOA. The measurement configuration is as follows:

1) Measurement Type: RSTD.
2) Measurement Period: 10 seconds.
3) Measurement Groups and Thresholds:
a) Group 1
PCI 107 and PCI 108, 100 Ts≤RSTD≤500 Ts; and
PCI 106 and PCI 108, 2300 Ts≤RSTD≤2500 Ts.
b) Group 2
PCI 141 and PCI 140, 1430 Ts≤RSTD≤3500 Ts; and
PCI 143 and PCI 140, 6900 Ts≤RSTD≤8900 Ts.
4) PRS configuration for PCI 106, 107, 108, 140, 141, 143.
5) RSRP Threshold: RSRP_30 (i.e., the UE does not perform positioning measurement if the RSRP of the cell is below this threshold).

It is noted that Ts is the granularity in time of an NR system. In this example, for the gNBs having PCI 107 and PCI 108, the UE would then have a measurement within the threshold if its RSTD measurement met 100 Ts≤RSTD≤500 Ts.

The value of M for the reporting event G1 should be the number of measurements that do not satisfy the criteria (e.g., RSTD beyond the threshold). So, in one example using this configuration, there are four measurements (two from group 1 and two from group 2), so reporting criteria could be that 3 (as M) out of 4 are successful (since in this case we are checking if UE is in the geofence area).

The RSRP in (5) above is meant to be used by the UE first to determine if the UE will even make the positioning specific measurement (e.g., RSTD). See, e.g., block 320 of FIG. 3. This is to help the UE limit the number of positioning specific measurements that the UE is required to make. However, it is also possible that if the RSRP threshold in (5) is not met, this can be counted as a failure also. So in this example if RSRP is too low, then this can count that as a failure for the last measurement also, which means that M could be increased from 3 to 4.

Another example concerns the positioning solution of SSB. Example configuration for SSB beam-index based positioning estimation is as follows. The measurement configuration follows.

1) Measurement Type: SSB beam received power or SINR.
2) Measurement Period: 10 seconds.
3) Measurement Groups:
a) Group 1
PCI 107, SSBbest∈{1, 2, 3, 4} (i.e., the best SSB beam index is within the configured set, where SSBbest corresponds to the index of the SSB beam with the highest measured RSRP or SINR);
PCI 106, SSBbest∈{12, 13, 14, 15, 16, 17, 18}; and
PCI 108, SSBbest∈{7, 8}.
b) Group 2
PCI 140, SSBbest∈{1, 2, 3, 4, 5};
PCI 141, SSBbest∈{20, 21, 22, 23}; and
PCI 143, SSBbest∈{34, 35, 36, 37, 38, 39, 40}.
4) SSB configuration for PCI 106, 107, 108, 140, 141, 143.
5) RSRP Threshold: RSRP_30 (i.e., the UE does not perform positioning measurement if the RSRP of the cell is below this threshold).

A further example is the positioning solution of DL-AoD. An example configuration for DL-AoD based positioning estimation is as follows. The exemplary measurement configuration is the following.

1) Measurement Type: AoD based on RSRP fingerprint (i.e., UE compares RSRP vector from different beams to saved look up table of AoD values).
2) Measurement Period: 10 seconds.
3) Measurement Groups:
a) Group 1
PCI 105, AoD∈[25°,45°];
PCI 106, AoD∈[80°,120°]; and
PCI 108, AoD∈[130°,145°].
b) Group 2
PCI 142, AoD∈[90°,115°];
PCI 144, AoD∈[10°,40°]; and
PCI 145, AoD∈[5°,75°]
4) AoD beam configuration for PCI 105, 106, 108, 142, 144, 145 (e.g., SSB beams).
5) AoD fingerprint tables for PCI 105, 106, 108, 142, 144, 145.
6) RSRP Threshold: RSRP_30 (i.e., the UE does not perform positioning measurement if the RSRP of the cell is below this threshold).

Another example is the positioning solution of DL-AoA. Note that DL-AoA is not currently on track for specification in NR Rel-16 but may be specified in future releases. Example configuration for DL-AoA based positioning estimation and the measurement configuration is as follows.

1) Measurement Type: AoA (note that this AoA measurement could also be set up as relative such that the orientation information is not needed to be calculated or known by the UE).
2) Measurement Period: 10 seconds.
3) Measurement Groups:
a) Group 1

PCI 105, AoA∈[15°,35°];
PCI 106, AoA∈[140°,165°]; and
PCI 108, AoA∈[75°,105°].
  b) Group 2
PCI 142, AoA∈[95°,125°];
PCI 144, AoA∈[10°,35°]; and
PCI 145, AoA∈[5°,25°].
  4) RS configuration for PCI 105, 106, 108, 142, 144, 145 (e.g., SSB beams).
  5) RSRP Threshold: RSRP_30 (i.e., the UE does not perform positioning measurement if the RSRP of the cell is below this threshold).

Figure 6:
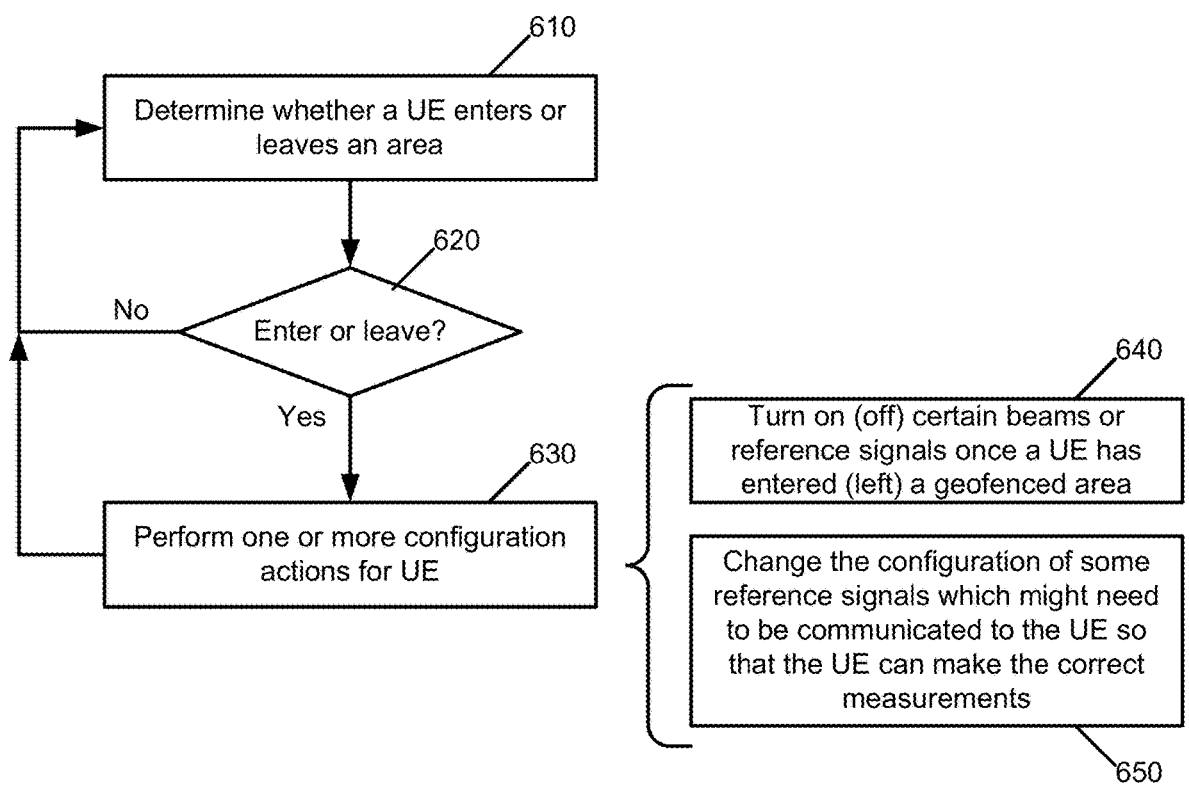
FIG. 6 is a flowchart for geofencing support for wireless devices such as NR-IoT devices, in accordance with an exemplary embodiment.

Although the primary emphasis in the network 100 has been placed on the location server 90, and the RAN node 170 is assumed to be a pass-through entity, it is also possible for the RAN node 170 to be more involved. FIG. 6 is a flowchart for geofencing support for wireless devices such as NR-IoT devices, in accordance with an exemplary embodiment. FIG. 6 illustrates the operation of an exemplary method or methods, a result of execution of computer program instructions embodied on a computer readable memory, functions performed by logic implemented in hardware, and/or interconnected means for performing functions in accordance with exemplary embodiments. The RAN node 170 is assumed to operate under control, at least in part, of the geofencing module 150.

In block 610, the RAN node 170 determines whether a UE enters or leaves an area. If not (block 620=No), the flow proceeds back to block 610. If so (block 620=Yes), the flow proceeds to block 630, where the RAN node 170 performs one or more configuration actions for the UE 110. For instance, in block 640, the RAN node 170 could turn on certain beams or reference signals once a UE has entered a geofenced area. Similarly, the RAN node 170 could turn off certain beams or reference signals once a UE has left a geofenced area. Both could also be performed, such as if different beam and/or reference signals are used in two different geofenced areas. Block 650 is another example, where the RAN node 170 changes the configuration of some reference signals which might need to be communicated to the UE so that the UE can make the correct measurements. This typically applies for entry into a geofenced area, but could also apply to leaving a geofenced area (e.g., perhaps the reference signals to be used are different outside the area).

It is noted that although the RAN node 170 (e.g., a gNB) is referred to with respect to FIG. 6, these functions may also be performed by the location server 90 (e.g., as an LMF). For example, the location server 90 would perform blocks 610, 620, and 630, and for blocks 640 and 650, the location server 90 would request the RAN node 170 to perform those functions (e.g., the location server 90 requests in block 640 for the RAN node 170 to turn on or off certain beams or reference signals).

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171, 71 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   receiving, at a user equipment from a wireless network, measurement configuration for one or more groups of cells wherein the measurement configuration is for positioning measurements of the user equipment using signals from one or more base stations in the wireless network;
   receiving, at the user equipment from the wireless network, criteria based on the measurement configuration for the user equipment to trigger one or more reports for the one or more groups of cells;
   performing, by the user equipment using at least the measurement configuration, positioning measurements of the one or more groups of cells; and sending, by the user equipment and toward the network, one or more reports that are triggered based at least on the criteria, wherein the criteria comprise one or more of the following:

the user equipment will send the one or more reports in response to at least M positioning measurements of at least one cell group of the one or more groups being within one or more corresponding configured thresholds; or the user equipment will send the one or more reports in response to less than N positioning measurements of all cell groups being within one or more corresponding configured thresholds, wherein M and N are integers, M>0, and N>0.

2. An apparatus, comprising:

at least one processor; and at least one memory including computer program code, the at least one memory and the computer program code configured, with the at least one processor, to cause the apparatus to perform operations comprising:

receiving, at a user equipment from a wireless network, measurement configuration for one or more groups of cells wherein the measurement configuration is for positioning measurements of the user equipment using signals from one or more base stations in the wireless network;

receiving, at the user equipment from the wireless network, criteria based on the measurement configuration for the user equipment to trigger one or more reports for the one or more groups of cells;

performing, by the user equipment using at least the measurement configuration, positioning measurements of the one or more groups of cells; and sending, by the user equipment and toward the network, the one or more reports that are triggered based at least on the criteria, wherein the criteria comprise one or more of the following:

the user equipment will send the one or more reports in response to at least M positioning measurements of at least one cell group of the one or more groups being within one or more corresponding configured thresholds; or the user equipment will send the one or more reports in response to less than N positioning measurements of all cell groups being within one or more corresponding configured thresholds, wherein M and N are integers, M>0, and N>0.

3. The apparatus of claim 2, wherein the measurement configuration comprises indications of one or more of the following: measurement cell groups, measurement type, measurement thresholds, measurement period, reference signal received power threshold for cell measurement, or reference signal configuration.

4. The apparatus of claim 2, wherein the measurement configuration is specific to a positioning solution used to measure a position of the user equipment in the wireless network.

5. The apparatus of claim 4, wherein the measurement configuration is for at least one measurement solution of (i) observed time difference of arrival, (ii) synchronization signal block, (ii) downlink angle of departure, or (iv) downlink angle of arrival and comprises a corresponding measurement type (i) comprising reference signal time difference, (ii) comprising either synchronization signal block beam received power or signal to interference plus noise ratio, (iii) comprising angle of departure based on reference signal received power fingerprint, or (iv) comprising angle of arrival, a measurement period, one or more measurement groups of cells and corresponding thresholds for position measurements in the cells in the one or more measurement groups, and positioning reference signal configuration for the cells in the one or more measurement groups.

6. The apparatus of claim 2, wherein the criteria comprise the user equipment will send the one or more reports with a configured periodicity that includes at least one of the following information: status of the user equipment relative to a geofence area or some measurement information.

7. The apparatus of claim 2, wherein the sending the one or more reports comprises the user equipment sending at least one report indicating which one of multiple events has been triggered.

8. The apparatus of claim 2, wherein the sending the one or more reports comprises the user equipment sending at least one report to the location server and the at least one report comprises some or all of the positioning measurements the user equipment made which lead to the sending of the report.

9. The apparatus of claim 2, wherein the measurement configuration and the criteria are used to determine position of the user equipment relative to a geofenced area.

10. An apparatus, comprising:

at least one processor; and at least one memory including computer program code, the at least one memory and the computer program code configured, with the at least one processor, to cause the apparatus to perform operations comprising:

sending, at a network element in a wireless network and toward a user equipment in the wireless network, measurement configuration for one or more groups of cells, wherein the measurement configuration is for positioning measurements of the user equipment using signals from one or more base stations in the wireless network;

sending, from the network element and toward the user equipment, criteria based on the measurement configuration for the user equipment to trigger one or more reports for the one or more groups of cells; and receiving, at the network element and from the user equipment, the one or more reports triggered based at least on the criteria, wherein the criteria comprise one or more of the following:

the user equipment will send the one or more reports if at least M positioning measurements of at least one cell group of the one or more groups are within one or more corresponding configured thresholds; or the user equipment will send a report if less than N positioning measurements of all cell groups are within one or more corresponding configured thresholds, wherein M and N are integers, M>0, and N>0.

11. The apparatus of claim 10, wherein the measurement configuration comprises indications of one or more of the following: measurement cell groups, measurement type, measurement thresholds, measurement period, reference signal received power threshold for cell measurement, or reference signal configuration.

12. The apparatus of claim 10, wherein the measurement configuration is specific to a positioning solution used to measure a position of the user equipment in the wireless network.

13. The apparatus if claim 12, wherein the measurement configuration is for at least one measurement solution of (i) observed time difference of arrival, (ii) synchronization signal block, (ii) downlink angle of departure, or (iv) downlink angle of arrival and comprises a corresponding measurement type (i) comprising reference signal time difference, (ii) comprising either synchronization signal block beam received power or signal to interference plus noise ratio, (iii) comprising angle of departure based on reference signal received power fingerprint, or (iv) comprising angle of arrival, a measurement period, one or more measurement groups of cells and corresponding thresholds for position measurements in the cells in the one or more measurement groups, and positioning reference signal configuration for the cells in the one or more measurement groups.

14. The apparatus of any of claim 10, wherein the at least one memory and the computer program code are further configured, with the at least one processor, to cause the apparatus to perform operations comprising: configuring by the network element the user equipment with a threshold for reference signal received power, to be used by the user equipment to perform positioning measurements of the one or more groups of cells only in response to a reference signal received power meeting the threshold.

15. The apparatus of claim 10, wherein:
the modifying comprises reconfiguring the user equipment's measurement configuration at least to request the user equipment to switch reporting events; and
the at least one memory and the computer program code are further configured, with the at least one processor, to cause the apparatus to perform operations comprising:
based on the one or more reports, modifying by one or both of the measurement configuration or the criteria to trigger the one or more reports for the user equipment and sending indication of modifications of one or both of measurement configuration or criteria toward the user equipment; and
requesting by the network element a base station able to communicate with the user equipment to change configuration of some reference signals that need to be communicated to the user equipment so that the user equipment can make correct measurements.

16. The apparatus of claim 10, wherein the measurement configuration and the criteria are used to determine position of the user equipment relative to a geofenced area.

17. The apparatus of claim 16, wherein the at least one memory and the computer program code are further configured, with the at least one processor, to cause the apparatus to perform operations comprising: requesting by the network element a base station able to communicate with the user equipment to turn on certain beams or reference signals once the user equipment has entered the geofenced area or to turn off the certain beams or reference signals once the user equipment has left the geofenced area.

* * * * *